United States Patent

Bull

[15] 3,686,982
[45] Aug. 29, 1972

[54] CABLE STRIPPING TOOL

[72] Inventor: Victor Edward Bull, 28 Union St., Northcote, Victoria, Australia

[22] Filed: Feb. 18, 1970

[21] Appl. No.: 12,419

[30] Foreign Application Priority Data

Feb. 18, 1969 Australia..............50,637/69

[52] U.S. Cl. ...............................................81/9.5 R
[51] Int. Cl. ...............................................H02g 1/12
[58] Field of Search..............81/9.5 R, 9.5 B, 9.5 C; 30/91.2, 90.2, 90.1, 90.6, 90.7

[56] References Cited

UNITED STATES PATENTS

| | | | |
|---|---|---|---|
| 3,572,189 | 3/1971 | Matthews | 30/90.1 X |
| 717,800 | 1/1903 | Bell | 81/9.5 UX |
| 2,902,759 | 9/1959 | Miller | 30/90.2 |

Primary Examiner—Robert C. Riordon
Assistant Examiner—Roscoe V. Parker, Jr.
Attorney—Woodhams, Blanchard and Flynn

[57] ABSTRACT

A cable stripping tool comprising clamp means having a pair of jaws adapted to close onto a cable for permitting stripping of the sheathing from the cable. A cutter element is mounted on one of the clamp jaws and is positioned to penetrate the sheathing upon closure of the jaws. The cutter causes a helical strip to be severed from the cable sheathing by rotating the clamp means around the cable. The cutter element preferably lies in a general plane which is longitudinal to but slightly offset from the central axis of the cable. The general plane of the blade is preferably slightly inclined at a small angle to the cable axis.

7 Claims, 12 Drawing Figures

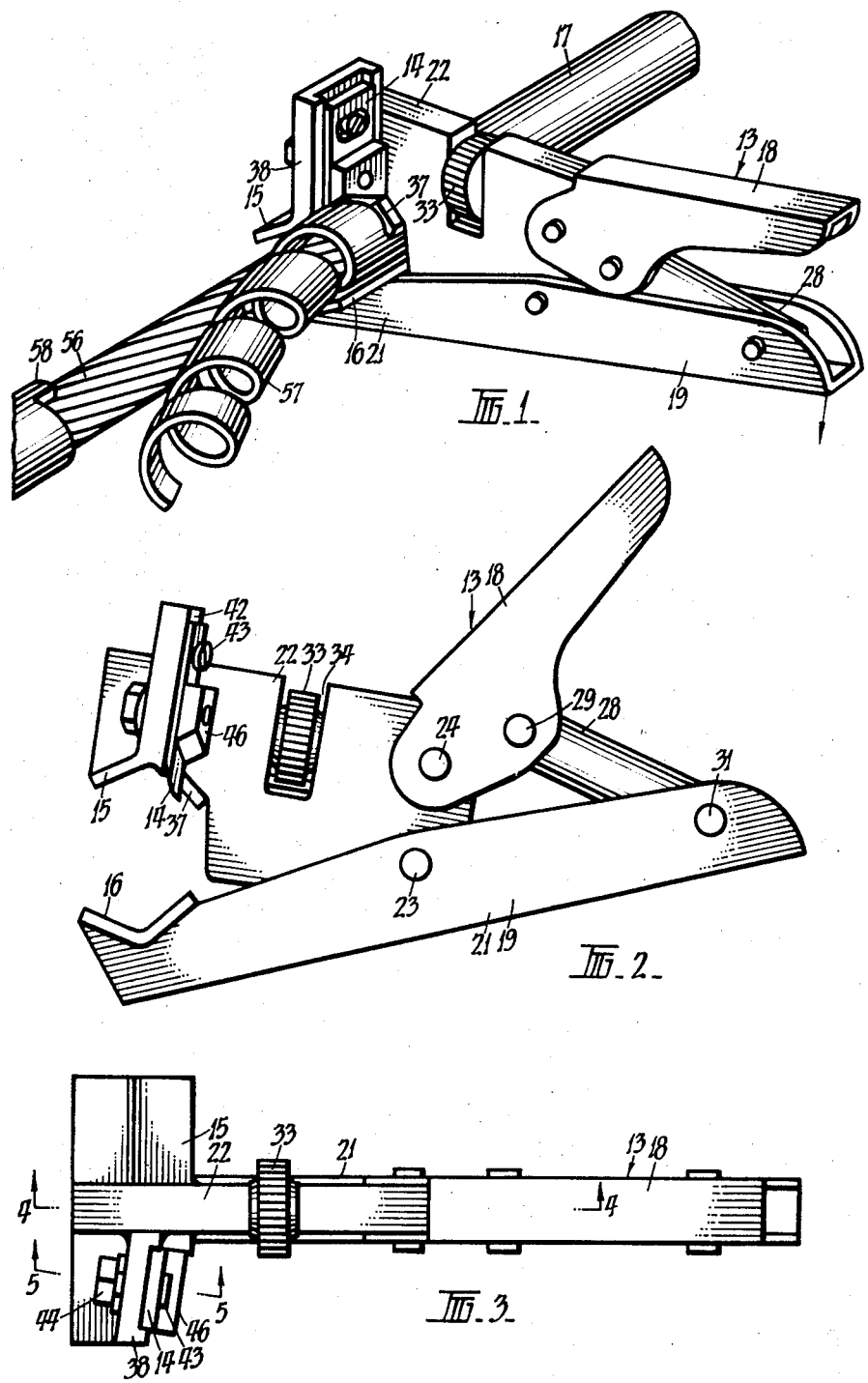

Patented Aug. 29, 1972

INVENTOR
VICTOR EDWARD BULL
BY
Woodhams, Blanchard & Flynn
ATTORNEYS

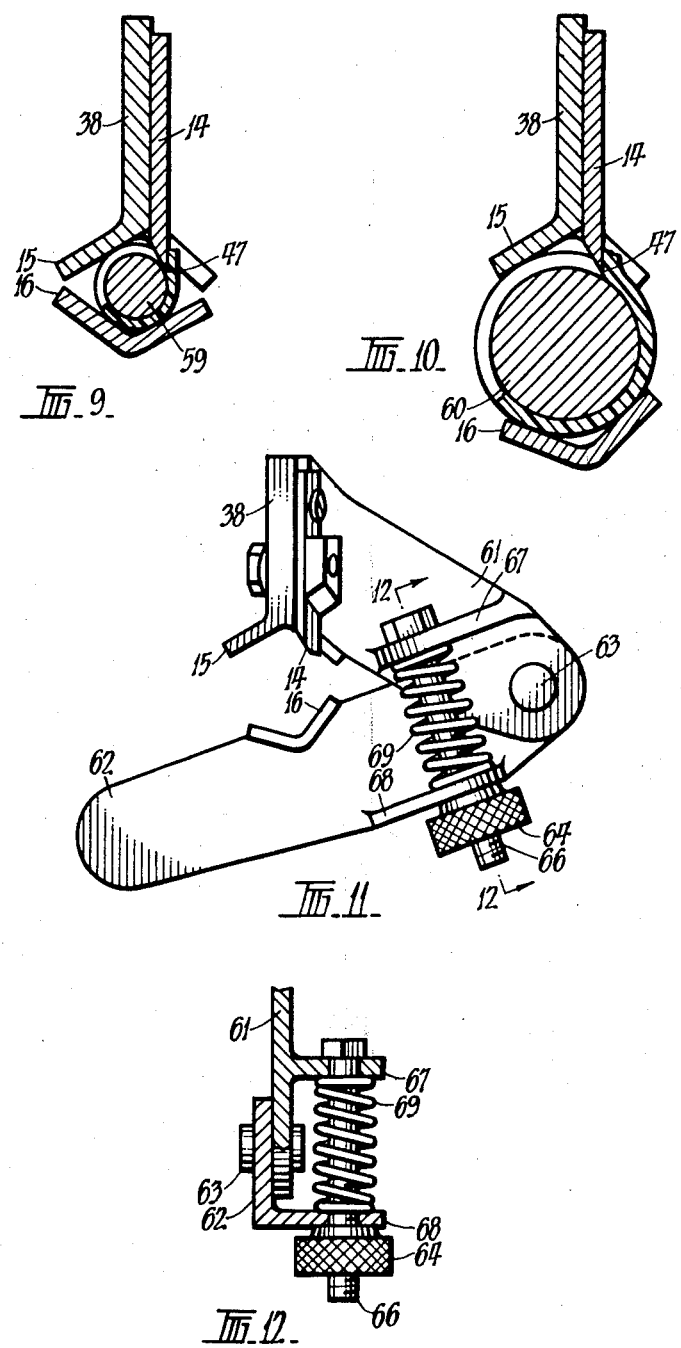

CABLE STRIPPING TOOL

BACKGROUND OF INVENTION

1. Field of Invention

This invention provides a novel form of cable stripping tool, i.e., a tool for the purpose of stripping sheathing from electric cable. The sheathing of the cable bay be comprised entirely of an insulating material or it may be of the king having a soft metal outer casing.

2. Brief Description of Prior Art

There are known forms of cable stripping tool comprising a cutter blade which in operation of the tool cuts a helical strip of sheathing from the cable to expose the core of the cable. However all previously known tools of this type have only proved satisfactory for stripping from a cable end and they have been of no use in cases where cable must be stripped at locations remote from its ends.

When erecting overhead electric cable, of the insulated type the cable must be stripped at regular intervals along its length and, in the absence of a satisfactory stripping tool, this is generally done at the present time by cutting with a sharp knife. This is not only laborious but also an extremely dangerous operation.

SUMMARY OF THE INVENTION

The present invention provides an improved stripping tool which can be operated quickly and safely to strip sheathing from a cable at a location remote from its ends. In its preferred form, the tool can be operated to strip the sheathing between precise predetermined limits and with cut edges exactly perpendicular to the longitudinal axis of the cable.

The cable stripping tool of the invention comprises a clamp which has a pair of jaws and is hand operable to close the jaws onto a cable to be stripped of sheathing, and, mounted on the clamp, a cutter element which is so shaped and positioned that on closing of the jaws onto the cable it penetrates the sheathing of the cable and can then be caused to sever a helical strip from the cable sheathing by rotating the clamp around the cable.

Preferably the cutter element is formed by a blade which, when it penetrates the sheathing, lies in a general plane which is longitudinal to the cable and is offset from the central axis of the cable. Although extending longitudinally of the cable, the general plane of the blade may be, and preferably is, inclined at a slight angle to the cable axis.

Preferably further, the blade has an inner end (with respect to the cable) which is generally saw-tooth shaped to facilitate penetration of the cable sheathing.

In order that the invention may be more fully explained, two particular embodiments thereof will now be described in detail with reference to the accompanying drawings.

BRIEF DESCRIPTION OF DRAWINGS

In the drawings:

FIG. 1 is a perspective view of one form of cable stripping tool operating to strip a cable;

FIG. 2 is a side elevation of the tool with its clamp jaws in an open condition;

FIG. 3 is a plan of the tool of FIG. 1;

FIGS. 9 and 10 are diagrammatic cross-sections illustrating the manner in which the tool can accommodate a wide variation of cable sizes;

FIG. 11 is an elevation of an alternative form of cable stripping tool constructed in accordance with the invention; and FIG. 12 is a cross-section on the line 12—12 in FIG. 11.

DESCRIPTION OF PREFERRED EMBODIMENTS

Figure 4:
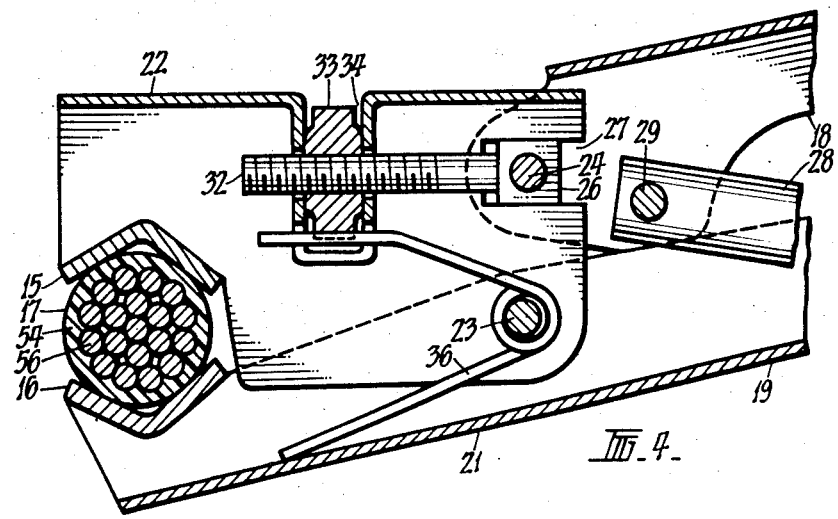
FIG. 4 is a cross-section on the line 4—4 in FIG. 3.

The stripping tool illustrated by FIGS. 1 to 10 comprises a hand operable jaw clamp denoted generally as 13, which is fitted with a cutter blade 14. Clamp 13 is of the type well known as a "toggle clamp". It comprises a pair of V-shaped jaws 15, 16 which can be closed onto a cable 17 by swinging a movable hand grip portion 18 from the position shown in FIG. 2 toward a fixed hand grip portion 19.

Hand grip portion 19 is formed by an end of a long lever 21 the other end of which carries the jaw 16. Jaw 15 is carried by a channel-shaped structure 22 which is pivotally connected to lever 21 by a pivot bolt 23. Hand grip portion 18 pivots about a pivot bolt 24 which is carried by a slide 26 fitted in a slot 27 in structure 22. A toggle bar 28 is pivotally connected at one end to hand grip portion 18 by pivot bolt 29 and it is pivotally connected at its other end to the outer end of hand grip portion 19 by means of a further pivot bolt 31. The arrangement is such that the clamp moves from the open condition of FIG. 2 to its closed condition (best seen in FIGS. 1 and 4) with an "over-center" action so that it will remain in the closed condition. A screw-threaded stem 32 extends from slide 26 to engage an internally threaded adjustment wheel 33 disposed in a slot 34 in the top of structure 22. Rotation of the adjustment wheel 33 moves the position of pivot bolt 24 by motion of the slide 26 along slot 27 whereby to vary the spacing of the closed position of jaws 15, 16 to suit the size of cable to be stripped. A resilient spring 36 located on pivot pin 23 acts between lever 21 and the serrated rim of wheel 33 to maintain the setting of the adjustment wheel.

One of the legs of the movable jaw 15 is recessed at 37 to enable the cutter blade 14 to project into the bight of jaw 15 and toward jaw 16. Cutter blade 14 is formed from a strip of tool steel and it is firmly fastened to a grooved channel-shaped member 38 formed integrally with jaw 15 and welded to the structure 22. The blade has slots 39, 41 and it is located in groove 42 of member 38 and firmly held in position by clamping means in the form of a clamping bolt 44 which extends through slot 41 to engage a clamping block 46. Tightening of clamping bolt 44 draws clamping block 46 firmly against the front face 40 of the blade. The blade can be positioned longitudinally of groove 42 by rotation of a slotted head 43 which is mounted eccentrically on a pin 45 and engages the slot 39 in the blade.

Blade 14 is set so that its general plane extends longitudinally of jaw 15 but is offset from a longitudinal plane through the apex or root of that jaw. Its inner edge which projects into the bight of jaw 15 is shaped generally to a saw-tooth having an inner tip 47. The short or "steep" side of the saw-tooth is defined by a single straight side edge 48 whereas the longer or "shallow" side is defined by two straight edge portions 49 and 50 which are slightly inclined to one another. The front face 40 of cutter blade 14 is planar right through to tip 47 whereas the rear of the blade is relieved so that inclined relief faces 51, 52, 53 extend back from cutting edges 48, 49 and 50 respectively.

In order to strip the cable 17 at a location between its ends the clamp jaws are firstly closed onto the cable at the required location. As the jaws close onto the cable the inner tip 47 of cutter blade 14 penetrates the sheath 54 of the cable. The geometry of the jaws and the blade is such that the closing action of the jaws causes the inner end of the cutter blade to penetrate the sheath of the cable. The general plane of the blade 6 then extends longitudinally of the cable and is off-set slightly from the central axis of the cable. It is almost parallel with a diametral plane of the cable but as will be appreciated from FIGS. 2 to 7 it in fact subtends a very slight angle to that plane and therefore to the axis of the cable. The geometry is such that the tip 47 of the blade just clears the central core 56 of the cable.

Figures 5, 6:
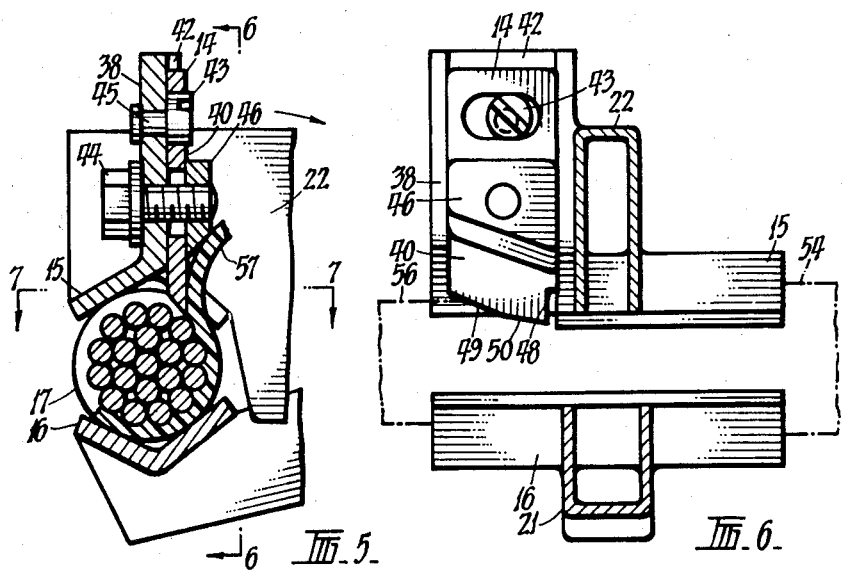
FIG. 5 is a cross section on the line 5—5 in FIG. 3.
FIG. 6 is a cross-section on the line 6—6 in FIG. 5.
Figure 7:
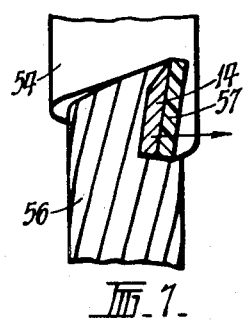
FIG. 7 is a cross-section generally on the line 7—7 in FIG. 5.
Figure 8:
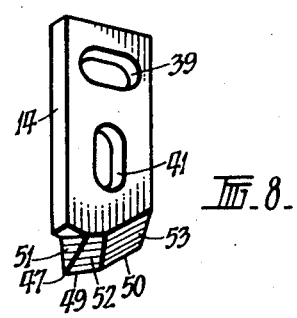
FIG. 8 is a perspective view of a cutter blade fitted to the tool of FIGS. 1 to 7.

The clamp is now rotated around the cable in the direction shown by the arrows in FIGS. 1, 5 and 7, i.e., so that the inner tip 47 leads the remainder of the cutter blade and the planar front face of the blade leads the relieved rear of the blade. This rotation causes that part of the sheathing in front of the buried part of the cutter blade to be peeled back against the front face 40 of the blade and the sides of this portion are severed by the edges 48 and 50 of the blade. At the start of the rotation only the lower part of the saw-tooth end of the blade extends into the insulation. Therefore, at first only a narrow portion of insulation is peeled. However this quickly widens as more of edge 50 feeds into the insulation due to the slight inclination of the blade to the longitudinal diametral plane of the cable. By continuing the rotation of the clamp and feeding it along the cable at the stem at the same time a helical strip 57 of the sheathing can be peeled from the cable to expose the core. FIG. 1 shows an exposed length of the core 56 and the cut edge 58 of insulation where the cutter blade first penetrated the sheath.

FIGS. 5 and 7 show the manner in which the blade strips back the insulation into the helical strip 57. The stripping action is very clean. Because the blade 14 is fed into the insulation material "face on" with its lower end leading, it provides a wedging action which lifts the insulation away from the core 56. Thus even though tip 47 may be some distance out from the core the insulation will be removed cleanly from the core and severed.

It has been found in practice that the tool can be used satisfactorily with cables of greatly differing sizes without altering the setting of the cutter blade 14. The only adjustment required is to alter the setting of the clamp jaws by means of wheel 33. FIGS. 9 and 10 illustrate diagrammatically the manner in which the tool can be closed onto two different cables 59, 60 of widely differing sizes. It will be seen in both cases the penetration of cutter blade 14 is such that its tip 47 lies immediately outside the core of the cable.

FIGS. 11 and 12 illustrate a different form of cable stripping tool constructed in accordance with the invention. This tool utilizes a clamp which is different from the toggle clamp of the previous embodiment but it has a pair of clamp jaws and a cutter blade which are identical to those of the previous embodiment and which are identified by like reference numerals. In this case the clamp jaws are mounted on a pair of clamp levers 61, 2 which are pivotally connected by a pivot pin 63. These levers can be swung toward one another by rotation of a knurled clamping nut 64 mounted on a bolt 66 which extends through holes in a flange 67 on lever 61 and a flange 68 on lever 62. The levers move together against the action of a biasing spring 69 disposed around bolt 66 to act between the flanges 67, 68 and thereby to provide an opening bias force.

The geometry of the jaws and the blade is precisely the same as in the previous embodiment so that when the jaws are closed onto a cable the blade penetrates the sheath in much the same manner. The tool is then rotated about the cable and it peels a helical strip of insulation from the cable in much the same manner as the previous embodiment.

Although the illustrated tools have proved to be most satisfactory in service it is to be understood that these tools have been advanced by way of example only. The invention is in no way limited to these particular constructions but may include many modifications and variations within its spirit and scope.

I claim:

1. A stripping tool for permitting sheathing to be stripped from a cable, comprising:

clamp means including a pair of relatively pivotable clamping jaws operable to close onto a cable to permit sheathing to be stripped therefrom;

cutter blade means, said cutter blade means being mounted on and fixedly secured to one of said jaws and opposing the other of said jaws whereby the cutting edge of said cutter blade means simultaneously penetrates the sheathing when the jaws are moved into said closed position in surrounding relationship to said cable; and means mounting said cutter blade means on said clamp means for positioning said cutter blade means in a general plane which in one direction is substantially longitudinal to the cable, which is offset laterally relative to the longitudinal axis of the cable, and which is aligned in a direction substantially transverse to said one direction with the direction of relative closing movement between the jaws such that an inner end of the cutter blade means simultaneously penetrates the sheathing of the cable upon closing of the jaws onto the cable, said inner end of the cutter blade means having a substantially planar face positioned remote from the cable axis and bounded at one side by a side edge whereby, by rotation of the tool about the cable with said planar face of the cutter blade means leading in the direction of rotation, said side edge can sever a helical strip of cable sheathing which strip is peeled back from the cable by engagement with said planer face.

2. A tool according to claim 1, wherein the general plane of the cutter blade means is inclined at a small acute angle relative to the cable axis.

3. A tool according to claim 1, wherein the cutting edge of the cutter blade means is generally of a saw-tooth shape to facilitate penetration of the cable sheathing, said cutter blade means being initially set relative to said clamp means so that only a tip portion of the saw tooth penetrates the sheathing upon closing of the clamp jaws onto the cable but on rotation of the tool about the cable a widening strip is cut by the sides of the saw-tooth shaped edge.

4. A stripping tool for permitting sheathing to be stripped from a cable, comprising:
clamp means including a pair of relatively movable clamping jaws operable to close onto a cable to permit sheathing to be stripped therefrom;
cutter blade means mounted on said clamp means for penetrating the sheathing of the cable upon closing of the jaws onto the cable, said blade means comprising a cutter blade having a cutting edge which is generally of a saw-tooth shape to facilitate penetration of the cable sheathing;
said cutter blade being disposed in a general plane which is longitudinal to the cable but is offset laterally relative to the longitudinal axis of the cable, said cutter blade having a side edge for severing the sheathing and a leading face for peeling back the severed strip of cable sheathing upon rotation of the tool about the cable whereby the tool severs a helical strip of sheathing from the cable;
said cutter blade being initially set relative to said clamp means so that only a tip portion of the saw tooth penetrates the sheathing upon closing of the clamp jaws onto the cable but on rotation of the tool about the cable a widened strip is cut by the sides of the saw-tooth sharpened edge; and
the cutting edge of said blade being substantially planar on the leading face thereof whereas the reverse face of the cutting edge is defined by inclined relief faces, said leading face being positioned remote from the cable axis.

5. A tool according to claim 1, wherein said cutter blade means comprises a platelike member having an elongated cutting edge along one edge thereof, said cutting edge extending substantially longitudinally of said cable and being adapted to contact and penetrate said sheathing substantially longitudinally of said cable.

6. A stripping tool for permitting sheathing to be stripped from a cable, comprising:
clamp means including a pair of relatively movable clamping jaws operable to close onto a cable to permit sheathing to be stripped therefrom;
said clamp means including first and second lever members each having a clamping jaw thereon with said jaws being disposed substantially opposite one another when said lever members are moved to a closed position to position said jaws in engagement with a cable, and pivot means coacting between said lever members for permitting relative pivotal movement thereof between opened and closed positions;
cutter blade means mounted on said clamp means for penetration of the sheathing of the cable upon closing of the jaws onto the cable, said blade means comprising a cutter blade disposed in a general plane which is longitudinal to the cable but is offset laterally relative to the longitudinal axis of the cable, said cutter blade means having a side edge for severing the sheathing and a leading face for peeling back the severed strip of cable sheathing upon rotation of the tool about the cable whereby the tool severs a helical strip of sheathing from the cable; and
said cutter blade being mounted on and fixedly secured to one of said jaws whereby the cutting edge of said blade automatically penetrates the sheathing when the jaws are moved into said closed position in surrounding relationship to the cable.

7. A tool according to claim 6, wherein said cutting blade comprises a substantially platelike member having an elongated cutting edge formed on one edge thereof, said elongated cutting edge extending substantially longitudinally of said cable when said jaws are moved into said closed position, and adjustment means coacting between said cutting blade and its respective jaw for permitting the position of said cutting blade to be selectively varied relative to said jaw.

* * * * *